(12) United States Patent
Richard et al.

(10) Patent No.: US 10,582,008 B2
(45) Date of Patent: Mar. 3, 2020

(54) HIGHLY ACCURATE BASEBALL PITCH SPEED DETECTOR USING WIDELY AVAILABLE SMARTPHONES

(71) Applicant: SmartPitch LLC, Hartsdale, NY (US)

(72) Inventors: Charles Allan Richard, Hartsdale, NY (US); Dexter Phillip Richard, Jackson Heights, NY (US)

(73) Assignee: SmartPitch LLC, Hartsdale, NY (US)

( * ) Notice: Subject to any disclaimer, the term of this patent is extended or adjusted under 35 U.S.C. 154(b) by 136 days.

(21) Appl. No.: 15/384,971

(22) Filed: Dec. 20, 2016

(65) Prior Publication Data

US 2017/0256066 A1 Sep. 7, 2017

Related U.S. Application Data

(60) Provisional application No. 62/304,147, filed on Mar. 5, 2016.

(51) Int. Cl.
| | | |
|---|---|---|
| *H04L 29/08* | (2006.01) | |
| *G06T 11/20* | (2006.01) | |
| *G06T 11/60* | (2006.01) | |
| *G06K 9/00* | (2006.01) | |
| *H04N 5/232* | (2006.01) | |
| *G06T 7/246* | (2017.01) | |
| *H04L 12/58* | (2006.01) | |

(52) U.S. Cl.
CPC ........ *H04L 67/306* (2013.01); *G06K 9/00664* (2013.01); *G06K 9/00724* (2013.01); *G06T 7/246* (2017.01); *G06T 11/206* (2013.01); *G06T 11/60* (2013.01); *H04L 67/04* (2013.01); *H04L 67/20* (2013.01); *H04L 67/2823* (2013.01); *H04N 5/23229* (2013.01); *G06T 2207/10016* (2013.01); *G06T 2207/30224* (2013.01); *G06T 2207/30241* (2013.01); *H04L 51/32* (2013.01); *H04L 67/104* (2013.01)

(58) Field of Classification Search
CPC ......... G06T 7/248; G06T 7/74; G06T 11/206; G06T 11/60; G06K 9/00664; G06K 9/00724; H04L 67/306; H04N 5/23229
See application file for complete search history.

(56) References Cited

U.S. PATENT DOCUMENTS

| | | | | |
|---|---|---|---|---|
| 2011/0299729 | A1* | 12/2011 | Dawe | A63B 24/0003 382/103 |
| 2013/0128022 | A1* | 5/2013 | Bose | H04N 7/18 348/77 |

(Continued)

*Primary Examiner* — Ayman A Abaza
*Assistant Examiner* — Hesham K Abouzahra
(74) *Attorney, Agent, or Firm* — Seth H. Ostrow, Esq.; Meister Seelig & Fein LLP

(57) ABSTRACT

A system for measuring ball speed, the system comprising a camera configured to capture a live video stream including a plurality of frames, a processor, a memory having executable instructions stored thereon that when executed by the processor cause the processor to load configuration information for initializing settings for the processor and the camera, receive data representation of an environment layout, analyze the plurality of frames to identify a ball, calculate a speed of the ball at a release point based on the analysis, generate data representative of the calculated speed, and a display operative to display the data representative of the calculated speed.

20 Claims, 15 Drawing Sheets

(56) References Cited

U.S. PATENT DOCUMENTS

2014/0300733 A1* 10/2014 Mitchell ............ G06K 9/00671
                                                  348/135
2016/0217325 A1*  7/2016 Bose ................. G11B 27/17
2016/0375302 A1* 12/2016 Troutner ........... G09B 19/0038
                                                  473/199
2017/0213087 A1*  7/2017 Chen ................ G06K 9/00724

* cited by examiner

HIGHLY ACCURATE BASEBALL PITCH SPEED DETECTOR USING WIDELY AVAILABLE SMARTPHONES

COPYRIGHT NOTICE

A portion of the disclosure of this patent document contains material, which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

CROSS REFERENCE TO RELATED APPLICATION

This application claims the priority of U.S. Provisional Application No. 62/304,147, entitled "HIGHLY ACCURATE BASEBALL PITCH SPEED DETECTOR USING WIDELY AVAILABLE SMARTPHONES," filed on Mar. 5, 2016, the disclosure of which is hereby incorporated by reference in its entirety.

BACKGROUND OF THE INVENTION

Field of the Invention

This application generally relates to a speed measuring device, and in particular, a speed measuring device adapted to detect the speed of a ball or other projectile on a sports field or other setting.

Description of the Related Art

It is desirable for a baseball pitcher to determine how fast he has thrown the ball. Conventionally, this is accomplished by using a radar gun positioned behind the catcher to whom the pitcher throws the baseball. The radar gun measures the speed by utilizing the Doppler effect, which is caused by a shift in the wavelength. Devices of this type under the trade names including Jugs and Stalker are relatively accurate, if used properly, but they are too expensive for most people, most models priced at $1,000 or higher. They attempt to capture true release speed but actually capture the speed at some distance away from the pitcher's hand after he or she has released the baseball and the ball has begun its travel toward home plate. Ownership and use of these radar guns is largely limited to professional sports organizations such as baseball teams, professional scouts, or the relatively small number of well-funded amateur sports teams at the college and high school level. At the lower end of the radar gun market are models sold as the Bushnell Velocity and Bushnell Speedster, priced around $100. These devices only detect and measure a baseball long after it has left the pitcher's hand, after the ball has traveled as much as ⅔ or ¾ of the distance between the pitching rubber and home plate and are highly inaccurate where 7 to 8 mph errors are common in measuring true release speed of the pitch, hence are of very limited use.

Existing smartphone applications claim to provide speed detection but are, in fact, just stopwatches. These applications ask the user to tap or press down on their smartphone when the user thinks the pitch is released and then very quickly tap again or release their finger when the user thinks the ball crosses the plate. Since a pitch takes only 0.5 seconds or less to travel the 60.5 feet between the pitcher's rubber and home plate, these are very inaccurate attempts to measure the speed. The lack of precision in tapping or releasing in order to try to time such a short interval (0.5 second or less) makes the speeds presented by these applications very inaccurate, with errors of +/−10 mph common. There is thus a need of a professional level, highly precise measurement device to determine the speed of a pitched baseball that provides a cheaper alternative to expensive professional radar guns.

SUMMARY OF THE INVENTION

The present invention provides a system and non-transitory computer readable media for measuring the speed of a ball or other projectile. The system comprises a camera configured to capture a live video stream including a plurality of frames, a processor, a memory having executable instructions stored thereon that when executed by the processor cause the processor to load configuration information for initializing settings for the processor and the camera, receive data representation of an environment layout, analyze the plurality of frames to identify a ball, calculate a speed of the ball at a release point based on the analysis, generate data representative of the calculated speed, and a display operative to display the data representative of the calculated speed.

According to one embodiment, the configuration information may include a frame rate configuration for the camera. The configuration information may also include settings for ambient temperature, light sensitivity, field size, field layout, and a pitcher's height. In another embodiment, the configuration includes settings for a variety of sports or balls. The processor may further generate an indication to align a view of the camera left or right and tilt the view of the camera up or down. The processor can further analyze the plurality of frames to identify an initial portion of flight of the ball to determine the release point. In certain embodiments, the processor further calculates the speed of the ball according to air drag factor, angle of planes factor, perspective factor, off-center distortion, vertical distortion, release point adjustment factor, scaling factors, and curvature of ball flight from gravity.

Analysis of the plurality of frames is operable in daylight and artificial lighting conditions. The processor may further transmit the data representative of the calculated speed to a server. The server may connect with and communicate with a social network service to share speed results. The processor may further transmit the data representative of the calculated speed to a peer computing device. The processor may also further transmit the data representative of the calculated speed to a peripheral device. The processor can store the data representative of the calculated speed to a pitch speed history for a user account for multiple users. The processor may also generate a graphical data representation based on the pitch speed history. In one embodiment, the processor may further identify pitch height at home plate and analyze a flight path of the ball for a plurality of types of pitches or ball movements including one or more of fastball, curveball, and topspin. In another embodiment, the types of pitches or ball movements correspond to cricket including dead, dusty and green top. The processor may further convert distance in pixels from the given frames into trial speed using regression modeling and iterative matching convergence to match the trial speed to a physics model of ball flight.

The non-transitory computer readable media comprises computer program code for capturing a live video stream including a plurality of frames, computer program code for loading configuration information for initializing settings for a processor and a camera, computer program code for receiving data representation of an environment layout, computer program code for analyzing the plurality of frames to identify a ball, computer program code for calculating a speed of the ball at a release point based on the analysis, computer program code for generating data representative of the calculated speed, and computer program code for displaying the data representative of the calculated speed on a display.

The configuration information may include settings for ambient temperature, light sensitivity, field size, field layout, and a pitcher's height. In at least one embodiment, the configuration may include settings for a variety of sports or balls. The non-transitory computer readable media may further comprise computer program code for generating an indication to align a view of the camera left or right and tilt the view of the camera up or down. The non-transitory computer readable media may also further comprise computer program code for analyzing the plurality of frames to identify an initial portion of flight of the ball to determine the release point. According to certain embodiments, the non-transitory computer readable media may further comprise computer program code for calculating the speed of the ball according to air drag factor, angle of planes factor, perspective factor, off-center distortion, vertical distortion, release point adjustment factor, scaling factors, and curvature of ball flight from gravity.

BRIEF DESCRIPTION OF THE DRAWINGS

The invention is illustrated in the figures of the accompanying drawings which are meant to be exemplary and not limiting, in which like references are intended to refer to like or corresponding parts.

DETAILED DESCRIPTION OF THE INVENTION

Subject matter will now be described more fully hereinafter with reference to the accompanying drawings, which form a part hereof, and which show, by way of illustration, exemplary embodiments in which the invention may be practiced. Subject matter may, however, be embodied in a variety of different forms and, therefore, covered or claimed subject matter is intended to be construed as not being limited to any example embodiments set forth herein; example embodiments are provided merely to be illustrative. It is to be understood that other embodiments may be utilized and structural changes may be made without departing from the scope of the present invention. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The presently disclosed system invention provides for automatic detection of a speed of a thrown ball or propelled object by using image detection and tracking techniques on video image data. The system may comprise a computing device including a video camera such as a smartphone. The computing device may further include live speed detection functionality that detects speeds from live pitching, bowling, serving, kicking, golf swing, etc. Live speed detection by the computing device may be employed for a variety of sports including, but not limited to, baseball, cricket, tennis, soccer, American football, golf, motorsports, archery and any shooting sport, or detecting the speed of any other projectile or object whose traversal can be captured by a camera.

Figure 1:
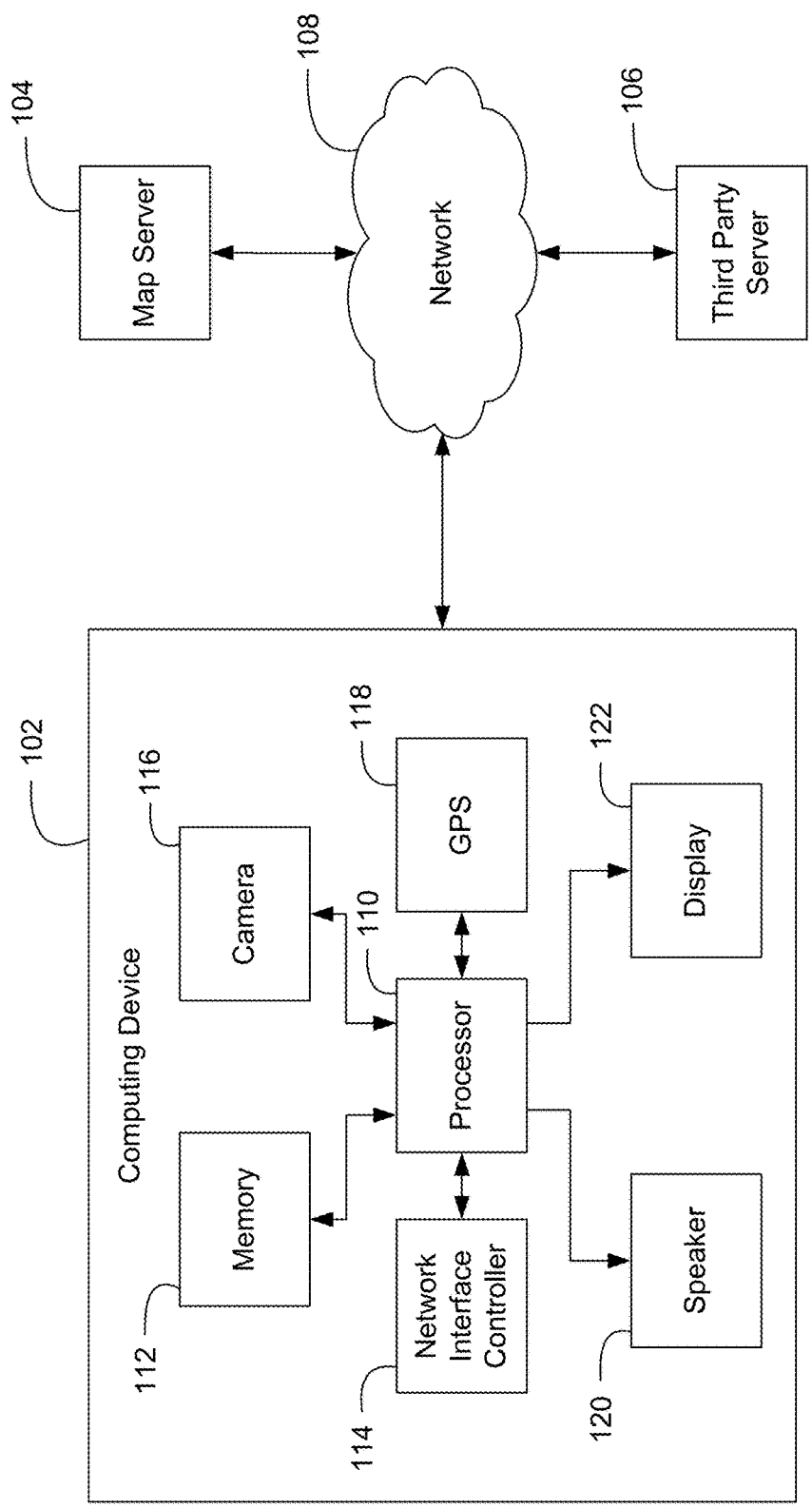
FIG. 1 presents a computing system according to an embodiment of the present invention.

FIG. 1 presents a computing system according to an embodiment of the present invention. The system comprises a computing device 102, map server 104, third party server 106, and network 108. Computing device 102 may be a device, such as, a computer, laptop, personal digital assistant (PDA), cell phone, smartphone, tablet computer, e-book reader, or any computing device. The computing device 102 includes processor 110, memory 112, network interface controller 114, camera 116, global positioning system (GPS) 118, speaker 120, and display 122. Display 122 may be a monitor screen, LCD or LED display, etc. The computing device 102 may also comprise a graphical user interface (GUI) or a browser application provided on the display 122.

In one exemplary embodiment, the computing device 102 may be a web-enabled client device, which may include one or more physical or virtual keyboards, mass storage, one or more accelerometers, one or more gyroscopes, global positioning system (GPS) or other location identifying type capability, or a display with a high degree of functionality, such as a touch-sensitive color 2D or 3D display. The computing device 102 may further include or execute a variety of operating systems, including a personal computer operating system, such as a Windows, Mac OS or Linux, or a mobile operating system, such as iOS, Android, or Windows Mobile, or the like. The computing device 102 may further include or execute a variety of possible applications, such as a client software application enabling communication with other devices, such as communicating one or more messages, such as via email, short message service (SMS), or multimedia message service (MMS), including via a network, such as a social network, including, for example, Facebook, LinkedIn, Twitter, Pinterest, Instagram, or Google+, to provide only a few possible examples.

According to at least one embodiment, memory 112 may include executable instructions or computer program code that when executed by the processor 110 cause the processor 110 to determine real-time pitch speeds of balls (or other thrown or propelled objects) by analyzing frames of live video provided by camera 116. Camera 116 may be configured to capture a live video feed including a plurality of frames of a ball flight or trajectory. The processor 110 may analyze the frames of live video to calculate the speed of any number of balls (e.g., being throw) at any given time within a sequence of frames by determining variables such as the position and distance traveled by the ball(s) in each successive frame. A pitch speed may be determined by examining a given number of frames from a ball's true release/contact point.

Processor 110 may include one or more processing units or cores to execute software that facilitates a plurality of simultaneous computations to calculate the speed of a ball from live video in real-time. The software may include optimized code to run live on a common mobile device and need not require high-powered computing devices or additional hardware such as standalone speed sensors or multiple fixed location cameras. As such, this provides an advantage over systems such as Pitchfx and Scoutee, which require substantially large computing power, multiple specialty high-speed cameras, and add-on devices. Camera 116 may be controlled to capture video frames at a predetermined rate. A new video frame may be created, for example, every 1/30th of a second by camera 116. Accordingly, the disclosed system may configure processor 110 to analyze the live video at a rate faster than the creation of frames from incoming streaming video data.

Analyzing the frames may further include machine vision processing, such as, filtering (e.g., noise of movement in background), segmentation, pattern recognition, and edge detection, to e.g., isolate the ball image from all other pixels against noisy backgrounds. In one embodiment, a ball detection algorithm may be employed to isolate a ball from the noisy visual backgrounds on a sports field, including tree leaves moving, flags moving, people walking or running, the pitcher's arms, head and legs, etc. Video frame analysis may be aided by mounting computing device 102 on a tripod or mounting bracket that can be attached to a wall or rail by providing video stabilization, e.g., reducing movement and shaking.

Additional parameters may be configured to improve precision in detecting speed including selecting a field type, pitcher's height, air temperature, field size (e.g., distances between bases and mound to home plate), and field layout. The computing device 102 is operable for any sport with moving ball, and with multiple field sizes. Computing device 102 may be used to measure ball speed from various locations on a field, such as, from a dugout, foul territory/out-of-bounds, where spectators sit, or stadium seats. Ball speeds may be adjusted for air density changes with temperature. For example, ball speeds may be adjusted slower in colder denser air and faster in hotter thinner air. The number of frames for a ball to reach home may be determined using a quadratic function of speed & temperature as would be known to those of ordinary skill in the art. A percentage of air drag slowdown may also be calculated as a quadratic function of speed of ball and/or a linear function of air temperature as would be known to those of ordinary skill in the art.

Gravity may be another factor used to adjust a ball's speed. A portion of a ball's trajectory path may be translated into horizontal speed movement toward the batter or target. According to one embodiment, the system may convert actual speed for pitches made under lesser conditions to equivalent "Professional" or "Competitive Conditions" speed. Adjustment factors may include, but are not limited to: air temperatures less than 70 degrees F.; wind greater than 20 mph coming from behind pitcher or facing pitcher; and normalization based on pitching off of flat ground (no mound) or mound conditions causing slippage, including holes, very loose sandy soil, or slippery grass or mud.

Figure 2:
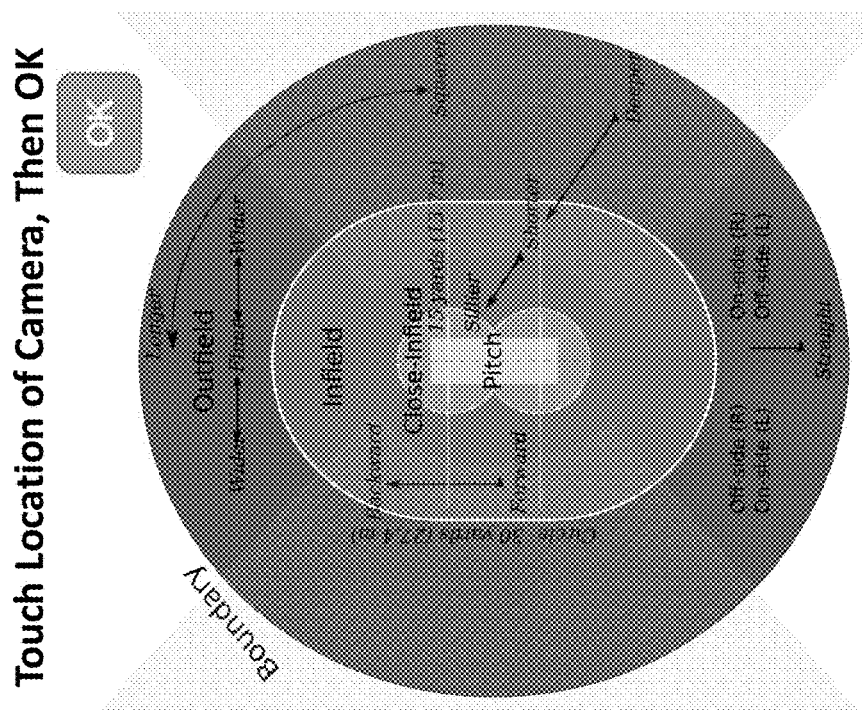
FIG. 2 illustrates an exemplary interface providing a plurality of locations on a field to set up the system disclosed herein.

A precise location on the field may be identified to further improve speed determination accuracy. According to one embodiment, GPS 118 may be used to determine the location of computing device 102 and retrieve satellite imagery from map server 104. Map server 104 may comprise satellite map services such as Google Earth. An image of the location (e.g., a ball field) may be presented on display 122 to prompt a user to identify the location of computing device 102 relative to certain reference points on the image, such as, on a baseball diamond or bases. For example, a user may place a mark over 1st base on a baseball diamond, or alternatively, other locations as shown on FIG. 2. Linear scaling equations may be used to convert touch screen pixel coordinates to consistently scaled sports field coordinates. Additionally, a camera view may be calibrated or positioned such that certain reference points, such as, the pitching mound, one or more bases, and other references of interest are aligned within the camera field. One or more reference lines may be arranged on the phone screen to mark the location of, e.g., the pitching rubbers and home plate. Light sensitivity may also be adjusted, either automatically or manually, to make video images brighter in dim environments.

Calculated ball speeds may be provided as output to display 122 and speaker 120. According to one embodiment, calculated ball speeds may be saved or recorded to a log and used to generated performance charts or graphs to serve as a training aid for any number of users, such as all players on a team or in a league. The log can be saved to a user account or profile stored either locally on computing device 102 or remotely on a database or server where it may be downloaded for analysis, printing, or display. Network interface controller 114 is operable to facilitate a connection to network 108. Content associated with the log, such as, textual content, multimedia content, or the like, may be communicated between computing device 102 and third party server 106 via network 108.

The third party server 106 is operative to receive requests from computing device 102 and process the requests to generate responses to the computing device 102 across the network 108. Third party server 106 is representative of servers that provide services such as social media, networking, data sharing, or data storage. Servers, as described herein, may vary widely in configuration or capabilities but are comprised of at least a special-purpose digital computing device including at least one or more central processing units and memory. A server may also include one or more of mass storage devices, power supplies, wired or wireless network interfaces, input/output interfaces, and operating systems, such as Windows Server, Mac OS X, Unix, Linux, FreeBSD, or the like.

The term "social network" refers generally to a network of individuals, such as acquaintances, friends, family, colleagues, or co-workers, coupled via a communications network or via a variety of sub-networks. Potentially, additional relationships may subsequently be formed as a result of social interaction via the communications network or sub-networks. A social network may be employed, for example, to identify additional connections for a variety of activities, including, but not limited to, dating, job networking, receiving or providing service referrals, content sharing, creating new associations, maintaining existing associations, identifying potential activity partners, performing or supporting commercial transactions, or the like. A social network may include individuals with similar experiences, opinions, education levels or backgrounds.

An individual's social network may refer to a set of direct personal relationships or a set of indirect personal relationships. A direct personal relationship refers to a relationship for an individual in which communications may be individual to individual, such as with family members, friends, colleagues, co-workers, or the like. An indirect personal relationship refers to a relationship that may be available to an individual with another individual although no form of individual to individual communication may have taken place, such as a friend of a friend, or the like. Different privileges or permissions may be associated with relationships in a social network. A social network also may generate relationships or connections with entities other than a person, such as companies, brands, or so called 'virtual persons.' An individual's social network may be represented in a variety of forms, such as visually, electronically or functionally.

In one embodiment, third party server 106 may forward or share ball speed data from computing device 102 to other remote devices such as other computing devices or peripheral devices such as light emitting diode (LED) display boards via network 108. Network 108 may be any suitable type of network allowing transport of data communications across thereof. The network 108 may couple devices so that communications may be exchanged, such as between servers and client devices or other types of devices, including between wireless devices coupled via a wireless network, for example. A network may also include mass storage, such as network attached storage (NAS), a storage area network (SAN), cloud computing and storage, or other forms of computer or machine readable media, for example. In one embodiment, the network may be the Internet, following known Internet protocols for data communication, or any other communication network, e.g., any local area network (LAN) or wide area network (WAN) connection, cellular network, wire-line type connections, wireless type connections, or any combination thereof. Communications and content stored and/or transmitted to and from the computing device 102 may be encrypted using, for example, the Advanced Encryption Standard (AES) with a 256-bit key size, or any other encryption standard known in the art.

Figure 3:
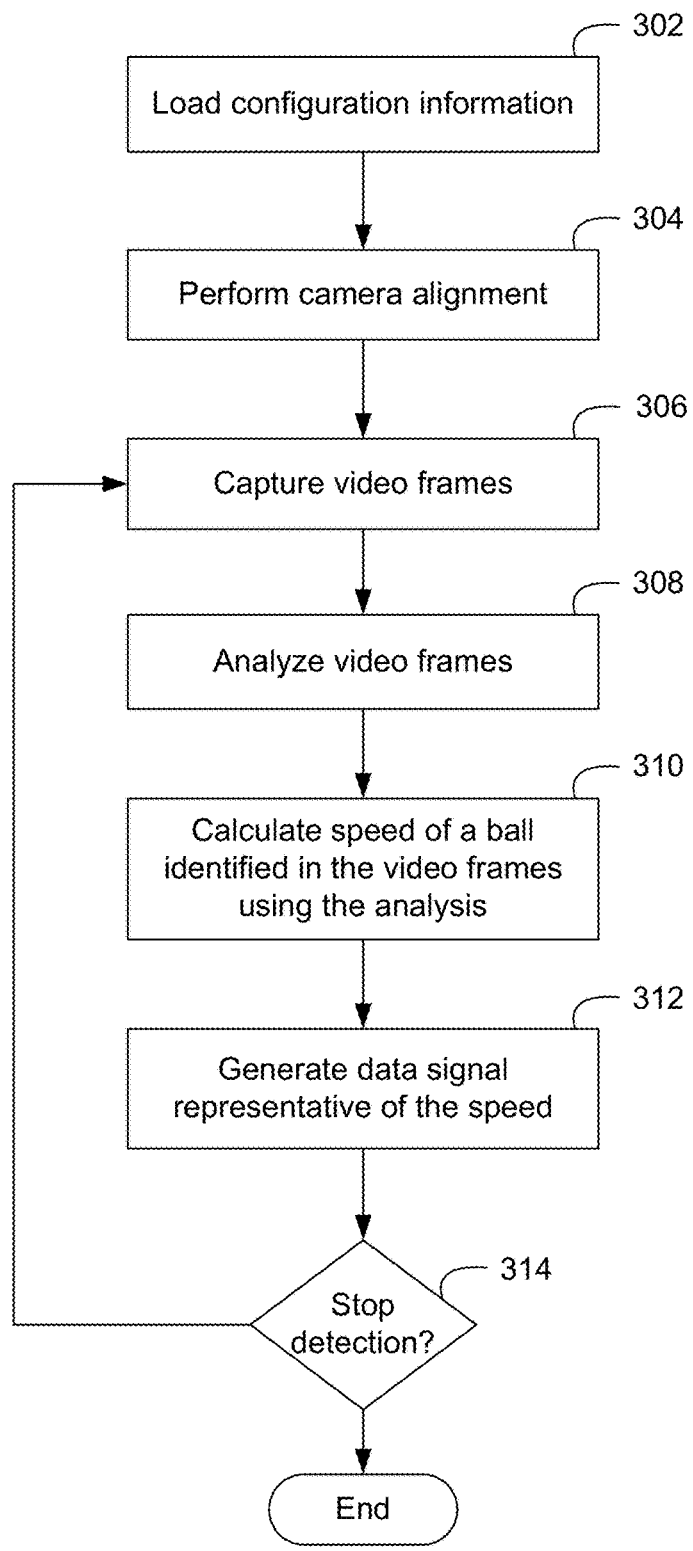
FIG. 3 illustrates a flowchart of a method for measuring speeds of balls captured on live video according to an embodiment of the present invention.

FIG. 3 presents a flowchart of a method for measuring speeds of balls captured on live video according to an embodiment of the present invention. Configuration information for ball speed determination is loaded on a computing device including a camera, step 302. The configuration information may include initialization of the computing device and its camera settings. In one embodiment, the camera's frame rate may be configured to a predetermined rate based on a selected sport. For example, the camera's frame rate may be configured with higher frames rates for measuring high-speed projectiles or other objects such as arrows, vehicles, or bullets. Other configurations may include ambient temperature, light sensitivity, field size, field layout, and pitcher's height, which can be used to adjust precision accuracy of speed calculations. The device may also be configured in different modes for tracking the speed of several types of sports or balls.

Camera alignment is performed, step 304. In one embodiment, the user of the computing device may be prompted to align a camera view left or right between home plate and the pitching rubber and/or up or down until a reference line is approximately at the pitcher's head. After a brief setup of the like by the user, the computing device may run automatically and untouched. This is a distinct advantage over existing systems that require constant user-intervention and marking of ball position on saved video files or saved film clips. Further adjustments for vertical tilt and for left and right off-center alignment may be performed automatically based on one or more regression calculations and factors disclosed herewith.

Video frames are captured, step 306. The camera may be used to capture a live video feed comprising a plurality of video frames. The video frames are analyzed, step 308. The method may analyze video files recorded from any source or provide real-time speed analysis through the video feed while recording live pitching. Analyzing the video frames may include identifying a ball in the video frames. Identifying a ball in video frames includes identifying a set of frames including ball movement and identifying a release point, which is discussed in further detail with respect to the description of FIG. 11. Analysis of the video frames may be configured for use in either daylight or artificial lighting conditions.

In pitcher evaluation and training, it is very important to know the speed of the ball at the release point, that is, the moment it leaves the pitcher's hand. Although the present system may use a first amount of given frames, speed calculation and adjustment factors to the calculation provide the speed that the ball is traveling at the release point. For example, the disclosed calculations take into account that the speeds in frames 2, 3 and 4 are slower than in frame 1 and that the ball travels a shorter distance in frames 2, 3, and 4. Accordingly, the presently disclosed system is not required to analyze all the frames between the release point and end of flight (which can be 12 to 35 frames depending on speed at 30 fps).

The speed of a ball identified in the video frames is calculated using the analysis, step 310. A distance traveled by the ball from a first frame (e.g., at a release point, or after the ball is out of the pitcher's hand) over one or more successive frames may be determined. An initial portion of flight of a ball may be used and data on entire flight of the ball is not required. Utilizing a certain amount of frames, such as four, may optimize the precision of the speed calculation that is performed in a next step. Calculating the speed of the ball may include applying a series of formulas and calculations that include the frame rate of the camera and the other sets of adjustments referenced herein.

Sets of distances traveled in given frames (e.g., one distance between each frame after release) may be selected and matched with distances the ball traveled as measured in the video of the given frames. That is, distance in pixels from the given frames can be converted into trial speed using regression models (e.g., statistical processes for estimating the relationship between a dependent and independent variable(s) such as, but not limited to, linear regression, polynomial regression, multiple regression, etc.) and an iterative matching convergence process to match the speed to a precise physics model of ball flight. Multiple versions of equations may be used for calculating trial speed as a linear function of feet traveled in the given frames. The exact distance travelled in each of the frames may be measured and scaled to, for example, hundredths of feet, to match against an actual distance the ball travels in the frames at different speeds according to camera positioning, angle, tilt, and other distortions. The calculation may also be augmented by factors, some of which may be based on the configuration information, the field layout parameters, environmental, and physical variables.

Data representative of the speed is generated, step 312. The speed data may be converted into a data signal, either video or audio, or both for output by the computing device. Alternatively, the speed data may be transmitted to another device (e.g., server, peer computing devices, or peripheral devices such as displays, scoreboards, speakers, storage memory device, printers, etc.) over a network. The speed data may be recorded into a session and stored as pitch speed history data in one or more user accounts. The method continues to capture video frames (step 306) until a signal to stop detection is received, step 314.

In certain embodiments, the captured video frames may be saved and recorded along with the speed data. The computing device may be used to tracking the progress of speed over time. For example, the method may further comprise generating and providing a graphical data representation of pitch speed data per session or over any user-specified time period from pitch speed history data for any number of users. An option may be offered to store a "real-time" analysis session and playback at a later date with pitch speeds displayed as a stored video is played-back, mapping the speed of the pitch recorded at the time each pitch appears on the video during playback. According to an alternative embodiment, the computing device may provide an option to perform the analysis and save results based on saved video files of a sports activity.

The following exemplary factors may affect the ball position as seen and recorded on the camera, which can be factored in the speed calculation:

Air drag factor—The air continually slows the ball between its release from the pitcher's hand and home plate. The speed at home plate is approximately 11% slower than the speed of the ball as it leaves the pitcher's hand in normal playing conditions. Air temperature and air pressure affect the degree of the slowdown from air drag resistance.

Figure 4:
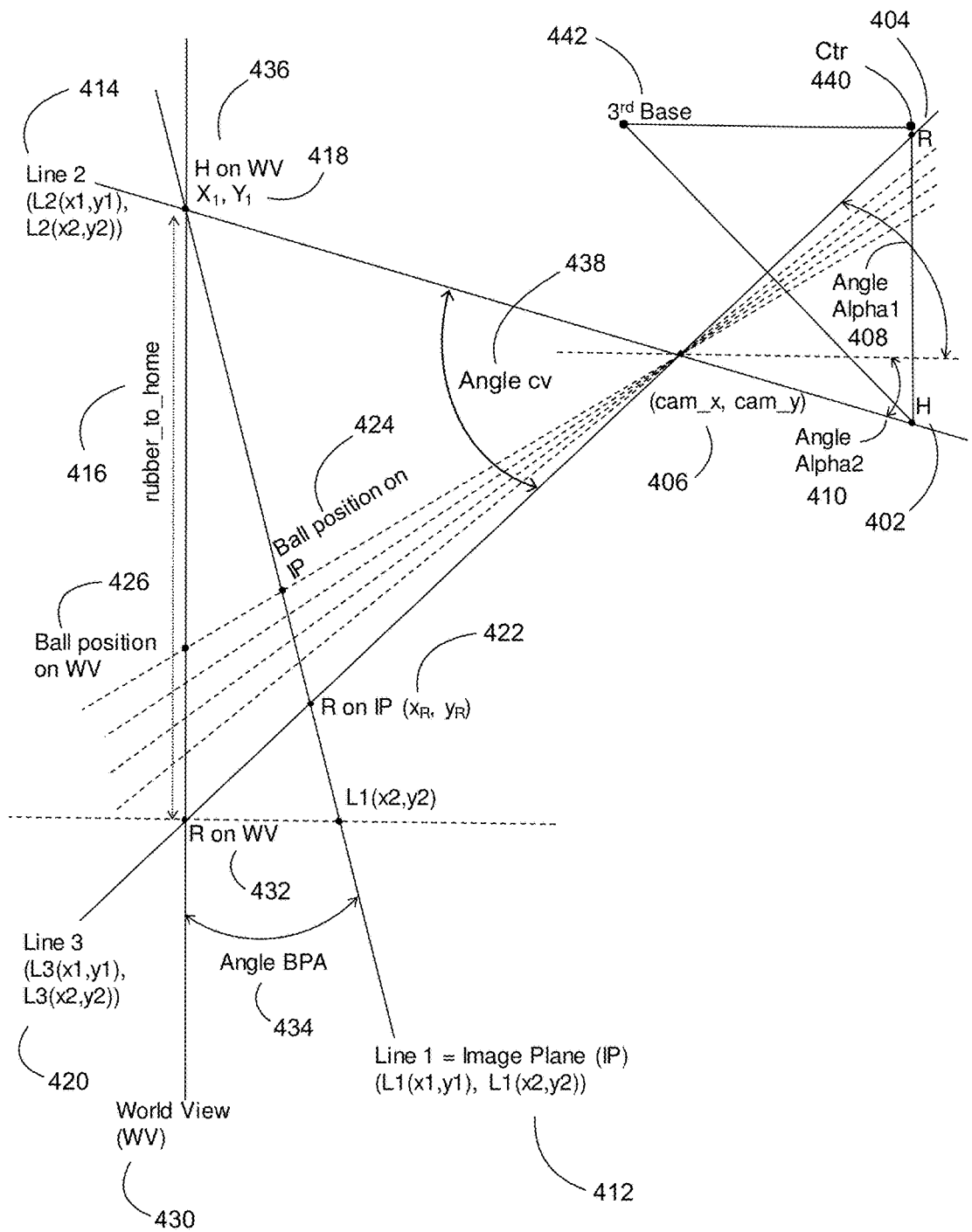
FIG. 4 illustrates exemplary conversion of ball travel distances from ball plane to distances seen on an image plan for various camera locations.

Angle of planes factor—The camera plane of view from its position on the baseball field is not necessarily, in general or in most cases, the same as the plane of the flight of the ball. Ball travel distances may be converted from ball plane to distances seen on image plane for various camera locations. The geometry for adjusting for these different angles is shown in FIG. 4, where H (402)=home plate projection; R (404)=rubber projection; IP (412)=image plane of camera; BPA (434)=back plane angle; WV (430)=world view, R on WV (432)=rubber on world view, H on WV (436)=home plate on world view, Ctr (440)=center of field, Ctr'd=centered camera angle, and (cam_x, cam_y) (406)=x and y coordinates of camera location (e.g., a dugout in the illustrated embodiment).

The following procedures may be executed to determine distance scale based on camera set up:

Camera Aimed "Exactly" Centered Left and Right

1) Solve for angles based on camera position coordinates of (cam_x, cam_y) (406), where dist_rubber_to_ctr=distance from Ctr (440) to R (404), ctr_to_base=distance from Ctr (440) to 3rd Base (442), cv (438)=total angle of the camera view, half_cv_ctrd=½ of cv, and bpa_ctrd=back plane angle when camera is centered on the cv:

$alpha\_1(408) = abs(a\tan((dist\_rubber\_to\_ctr + cam\_y)/cam\_x));$ $alpha\_2(410) = a\tan((cam\_y + ctr\_to\_base)/cam\_x);$ $cv(438) = alpha\_1(408) + alpha\_2(410);$ $half\_cv\_ctrd = cv(438)/2.0;$ $bpa\_ctrd = half\_cv\_ctrd - alpha\_2(410).$ 2) Set up coordinates for Line 1 or IP (412) and Line 2 (414):
Line 1 (L1(x1,y1), L1(x2,y2))=
L1(x1)=0.0;
L1(y1)=rubber_to_home (416);
L1(x2)=tan(bpa_ctrd)*rubber_to home (416);
L1(y2)=0.0.
Line 2 (L2(x1,y1), L2(x2,y2))=
L2(x1)=0.0;
L2(y1)=rubber_to_home (416);
L2(x2)=cam_x;
L2(y2)=−cam_y+dist_rubber_to_ctr.

3) Solve simultaneous equations for intersection of Line 1 (412) and Line 2 (414). Solutions to the coordinates of the intersections of the two lines can be defined by a pair of coordinates along each line.

4) Intersection creates $(X_1, Y_1)$ (418) coordinates.

5) Set up Coordinates for Line 3 (420):
Line 3 (L3(x1,y1), L3(x2,y2))=
L3(x1)=0.0;
L3(y1)=dist_rubber_to_ctr;
L3(x2)=cam_x;
L3(y2)=−cam_y+dist_rubber_to_ctr.

6) Solve simultaneous equations for intersection of Line 1 (412) and Line 3 (420), in a manner similar to step 3).

7) Intersection creates $(x_R, y_R)$ coordinates of rubber on image plane (R on IP) 422.

8) Determine apparent length in feet of rubber to home on image plane=segment from $(X_1, Y_1)$ (418) to (R on IP) 422.

9) Divide pixels from rubber to home from video image by the determined apparent length in feet, to establish pixels/foot scale to for use in calculation of ball travel and speed for exactly (or substantially) centered camera set-up.

Camera Aimed Off-Center

1) Use differences in pixels from rubber to right edge of video and from home to left edge of video to determine amount by with camera is aimed off-center.

2) Calculate an off-center BPA 434.

3) Solve for off-center Line 1 (412), Line 2 (414), and Line 3 (420) by using off-center BPA 434.

4) Calculate off-center scale in pixels/foot for use in calculation of ball travel and speed for off-centered camera set-up.

The above procedures to determine distance scale based on camera set up may then facilitate calculating apparent distance moved by ball position on image plane 424 in each video frame. Equations for the intersection of the lines (e.g., Line 1 (412), Line 2 (414), and Line 3 (420)) may be solved for a plurality of frames by changing the Line 3 (420) y-coordinate to match ball movement from time of release (or the release point) to, for example, frame 1, frame 2, frame 3, and frame 4, on WV (ball position on WV 426 where each dash line corresponds to a given frame), while Line 1 (412) and Line 2 (414) remain constant. Accordingly, an apparent release point seen in video (along the image plane) can be normalized or converted to a consistent release point distance along the path of the ball from starting to ending point (along the world view plane). Additionally, the scaling conversions of distances may be determined as a linear function of the resolution of the camera.

Figure 5:
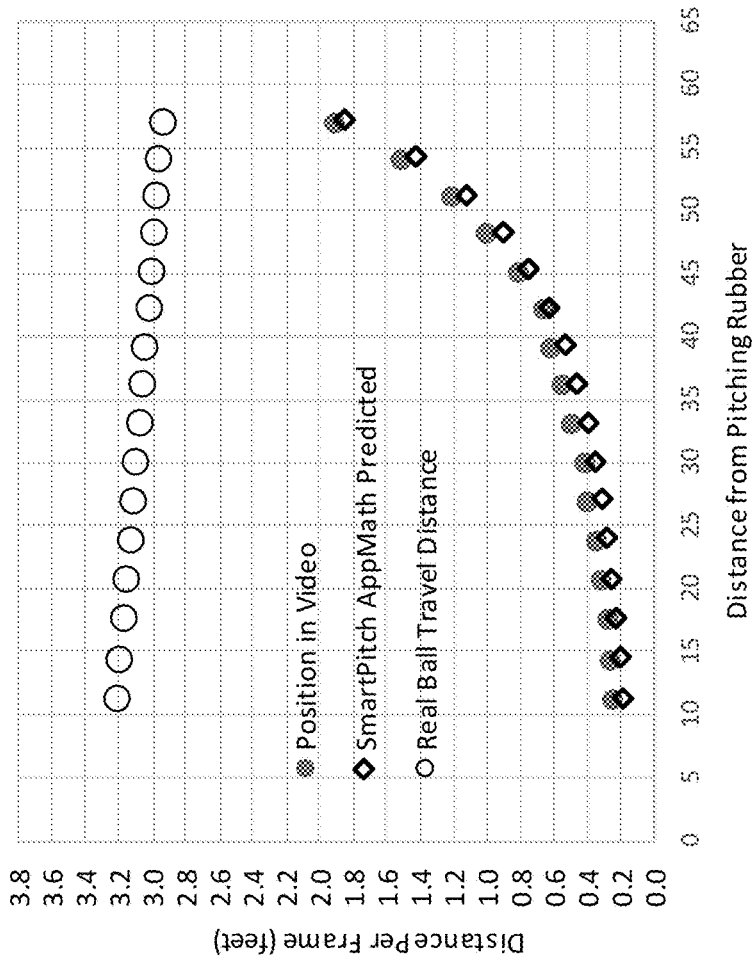
FIGS. 5 and 6 illustrate exemplary conversion of ball travel distances into differently spaced distances seen in video image for various camera locations.
Figure 6:
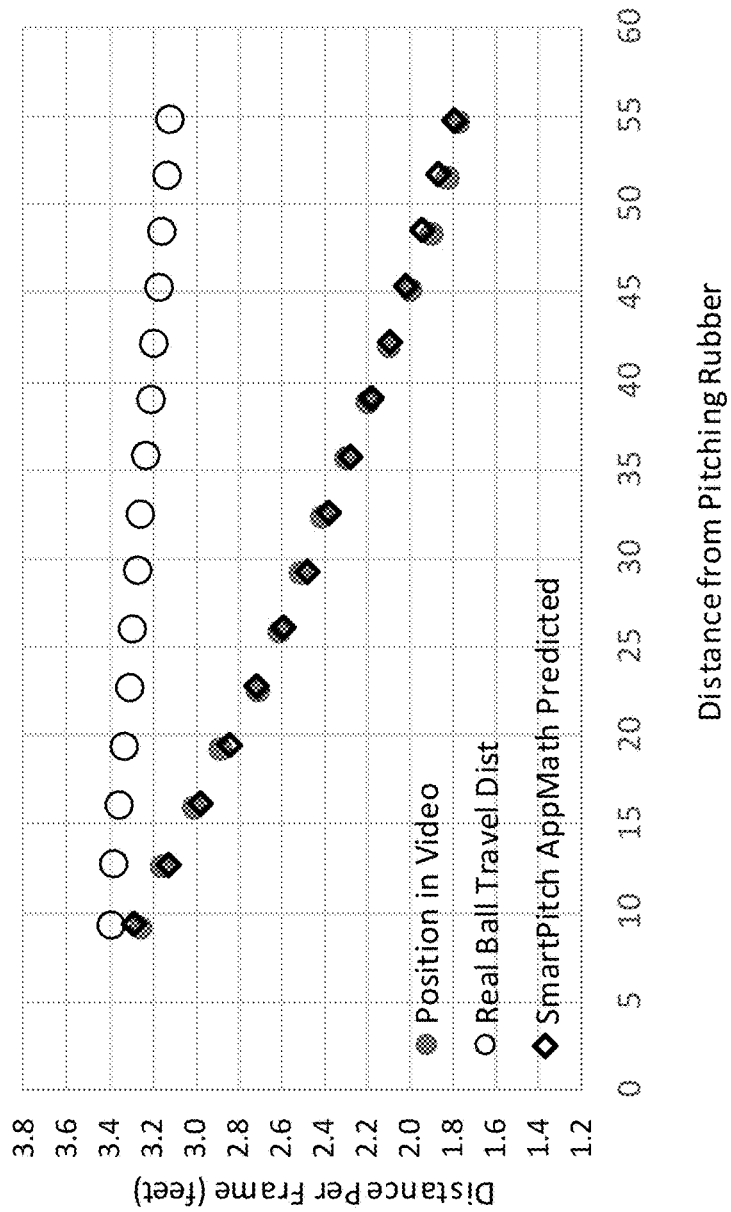

Perspective factor—Constant distances can appear shorter the further they are from a camera. This factor may be used to adjust for this "shortening" effect of perspective. Adjustments to compensate for the combined effects of perspective and "angles of planes" factors may be made according to exemplary embodiments as illustrated in FIGS. 5 and 6. A conversion of travel distances into differently spaced distances as seen in camera may be made. FIG. 5 presents approximate values for adjusting ball travel for a position where the camera is eight feet behind home plate and 13 feet to the side. In the illustrated example, the by-frame distances seen in video image are initially very short at 1/16 actual ball travel, but grow rapidly in video image as ball approaches home plate to 2/3 actual ball travel distance. FIG. 6 presents approximate values for adjusting ball travel for a position where the camera is at first base. In this example, the by-frame distances seen in video image initially nearly same as actual ball travel, but shrink in video image to about 1/2 actual ball travel as ball approaches home plate.

Figure 7:
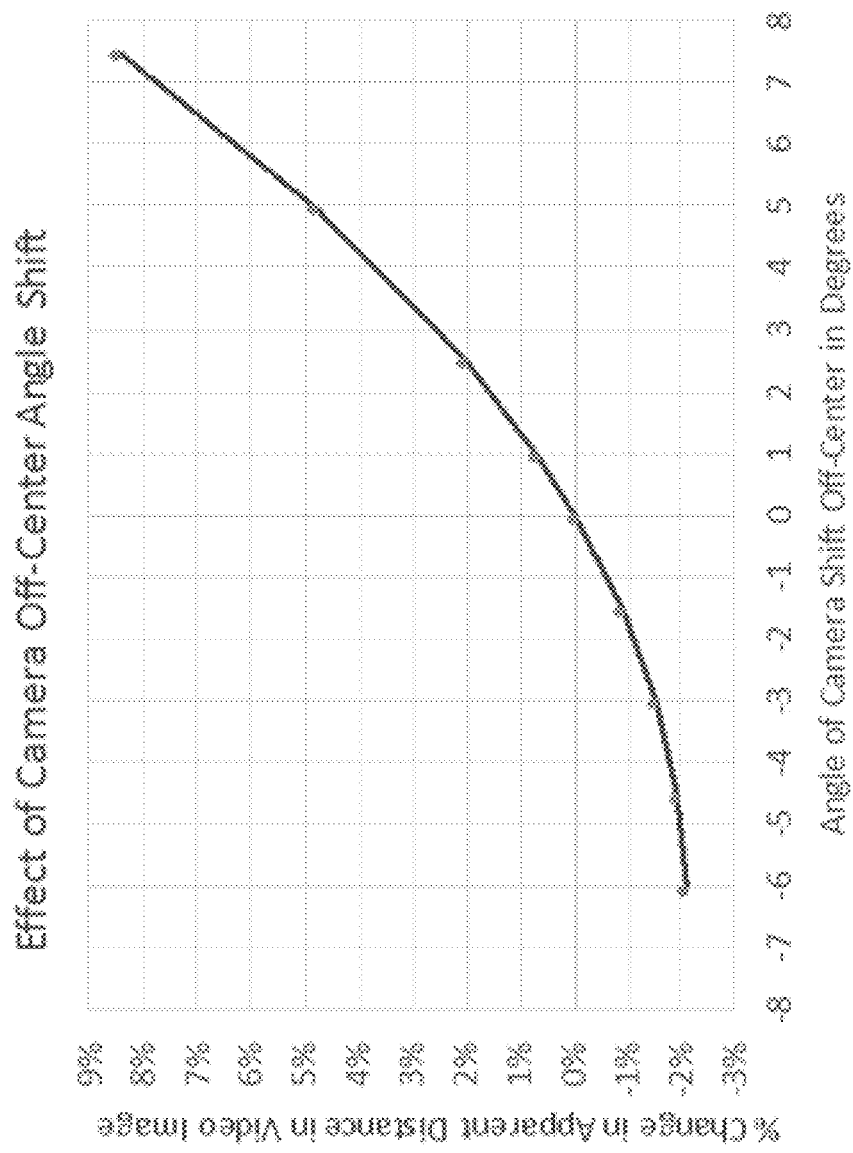
FIG. 7 presents exemplary effects of camera off-center angle shift.

Off-Center distortion—FIG. 7 presents exemplary calculations for detecting and adjusting the effect of the camera aimed off-center left or right. There may be instances where the camera is aimed off-center from a pitching target. The disclosed system is operable to detect the angle shift of the camera, calculate pixels/feet scaling factors affected by off-center aiming, and convert distances to adjust for the different distances. Camera location driven adjustments may be made for the effects of off-center camera aiming on the apparent distances in the video image that the ball travels to correct for this effect.

Figure 8:
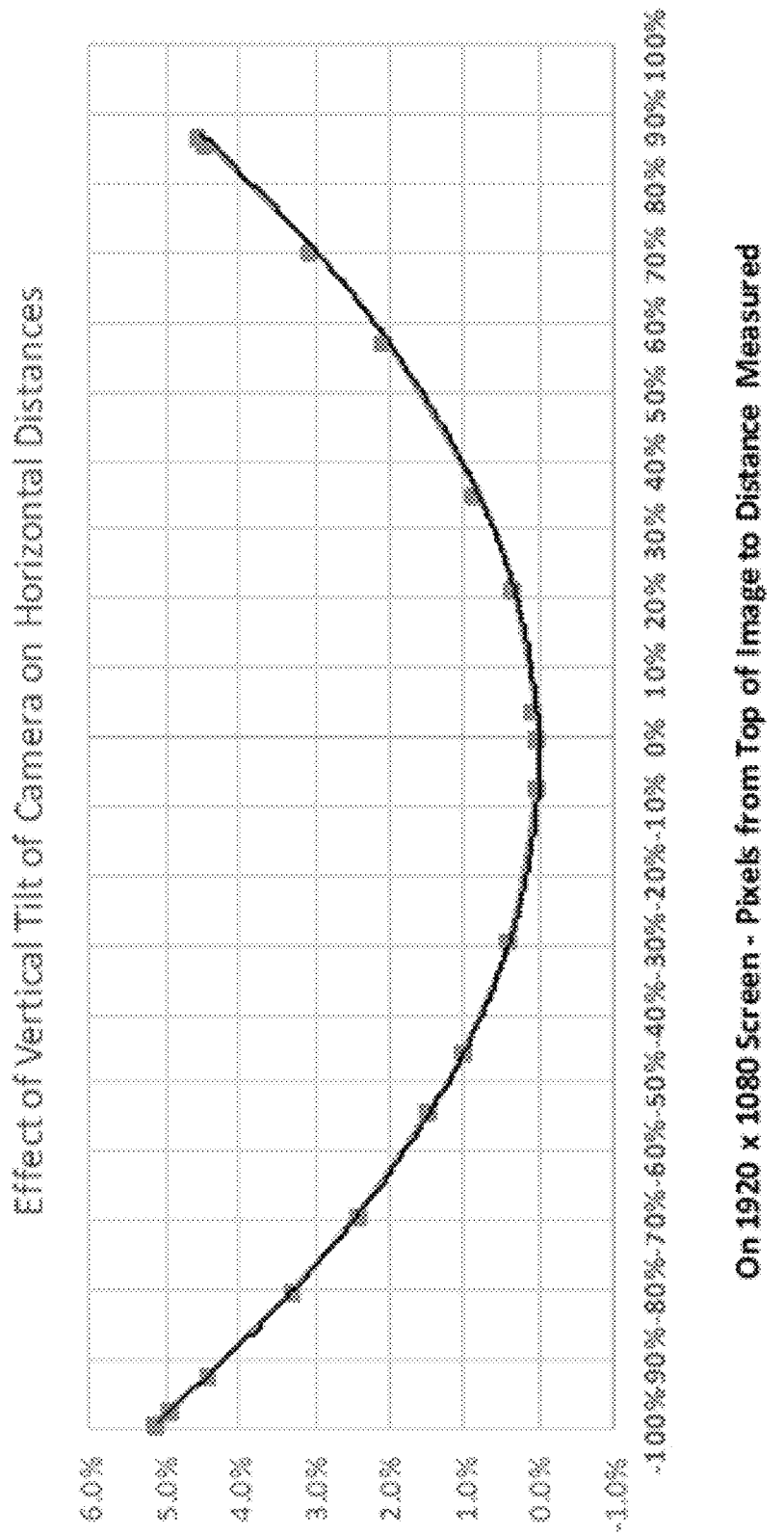
FIG. 8 presents exemplary effects of vertical tilt of camera on horizontal distances.

Vertical distortion—As a camera is tilted upward toward the sky or downward toward the ground, when moving from the center of the field of view toward the top or bottom of the screen, apparent distances may appear longer than they actually are. The disclosed system may calculate or reference databases to correct for these distortions, called "keystoning" effects. A correction for video image distance distortion is made as a function of the degree camera is tilted upward or downward (FIG. 8). A percentage of apparent distance distortion as a quadratic function of percentage of camera tilt up or down may also be determined.

Figure 9:
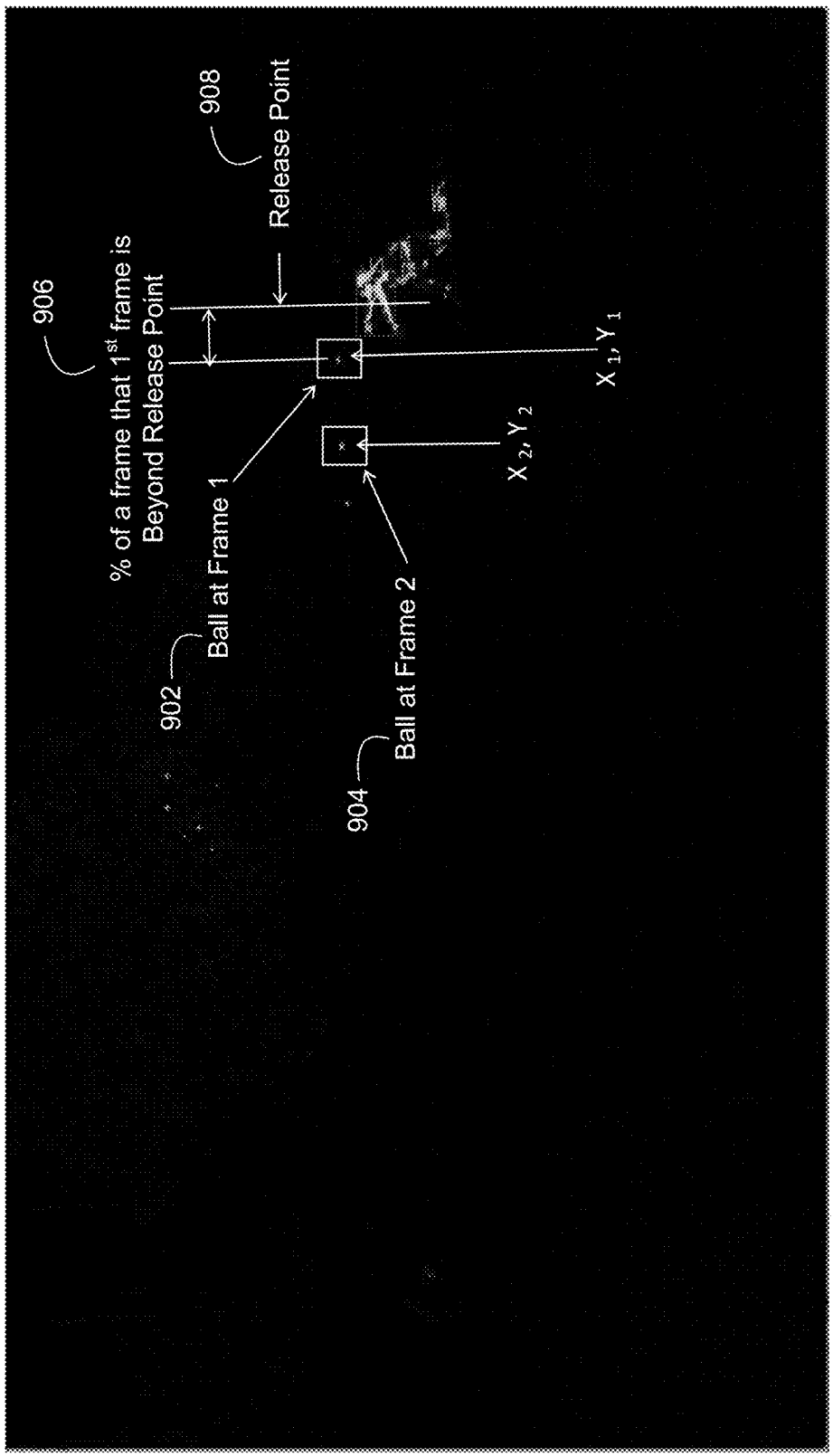
FIG. 9 presents exemplary image analysis for identifying a ball in successive frames.

Release point adjustment factor—The first frame captured by video at or after the point the ball leaves the pitcher's hand is not, in general, the exact point when ball is released from pitcher's hand. To calculate the true release speed of a pitch, and given air drag and angle of view differences (e.g., variable camera locations), a release point adjustment factor can be used to determine the speed of a ball at the point of release. FIG. 9 presents exemplary image analysis for identifying a ball in successive frames. The exemplary image includes a combined image of two frames where a pitcher is visible on middle right of video image, with two arm angles (one from each frame). Heuristically determined adjustments may be applied dynamically to the video contrast and light sensitivity of the video image analysis as a function of the observed image density. A linear equation may be used to convert a position of the end of the arm of the pitcher (or other sports source of ball movement) to the release point along the horizontal dimension between the rubber and home (or equivalent start and end points).

Figure 10:
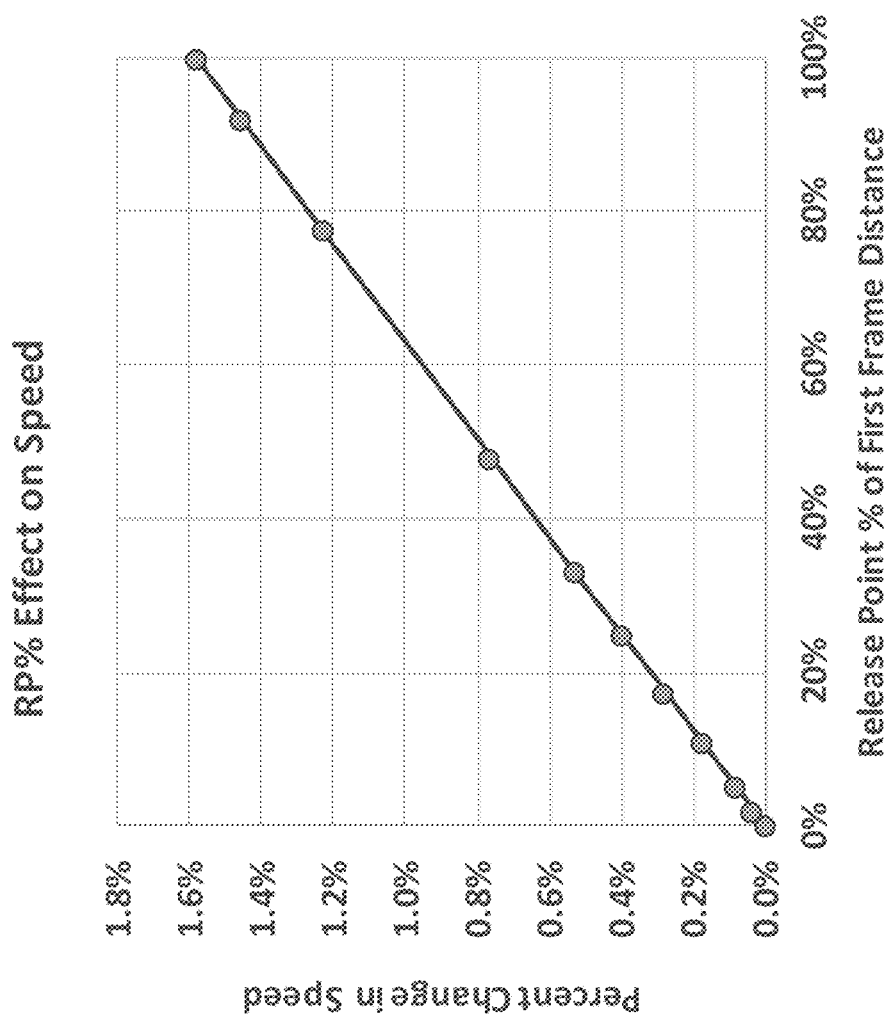
FIG. 10 presents exemplary effect of release point distance on speed.

The speed of a ball may be determined at the true release point as a linear function of the portion of a frame elapsed before the ball was released. A first free ball ("Ball at Frame 1" 902) at $(X_1, Y_1)$ and a second free ball ("Ball at Frame 2" 904) at (X2,Y2) may be identified from the combined video image. A distance of the first free ball at frame 1 $(X_1, Y_1)$ from a "Release Point" 908 is determined as a percentage of the first frame distance 906. Distance may be precisely scaled, e.g., to hundredths of feet, extracted using pixel coordinates. An adjustment to a calculated speed may be made to convert an observed first free ball to actual speed at 0% Release Point (FIG. 10). A shift in the number of frames for the ball to reach home as a linear function of actual release point distance from rubber (or equivalent starting point) may also be calculated.

Figure 11:
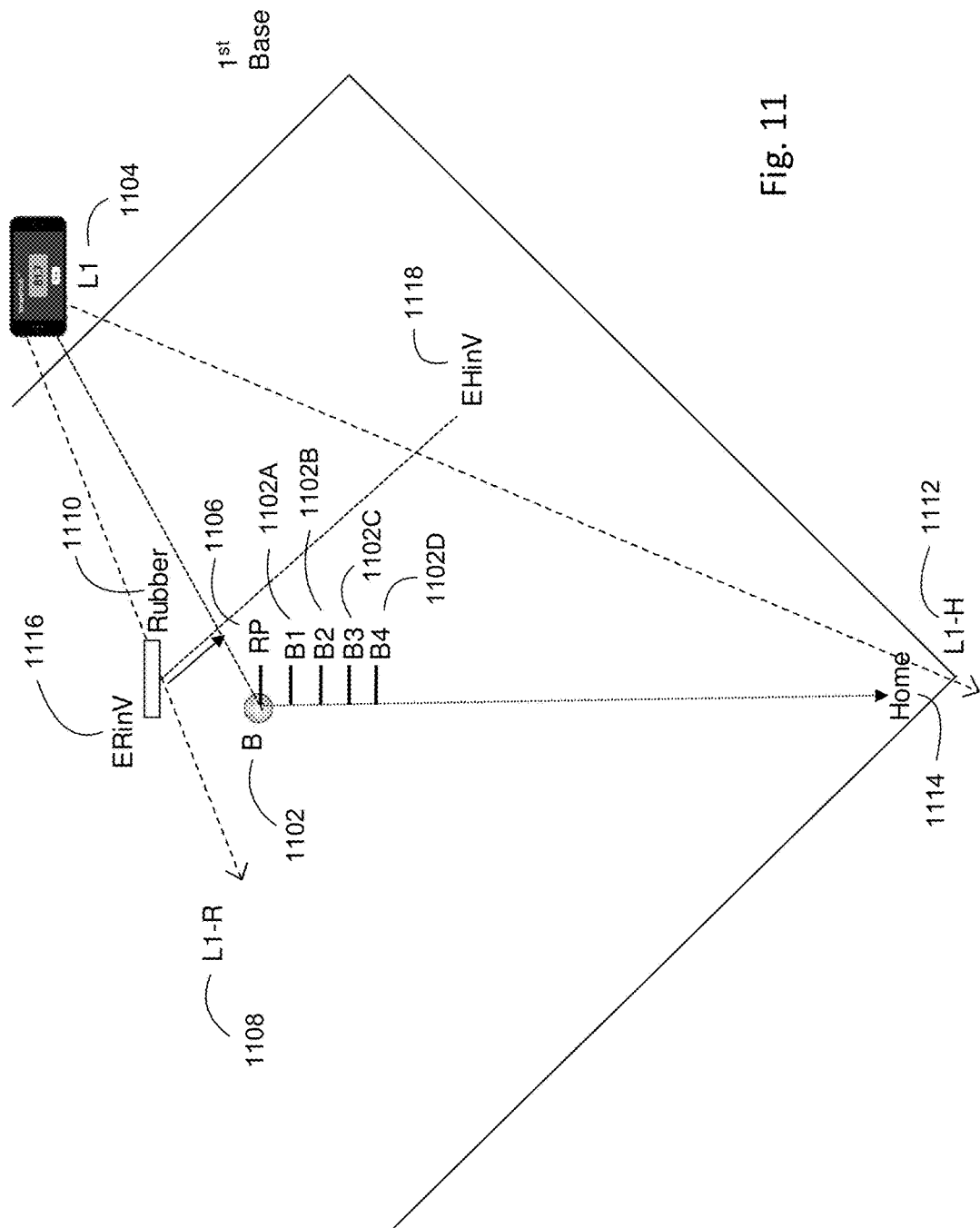
FIGS. 11 and 12 present exemplary projections for apparently different release point distance when a same ball is seen from different locations.
Figure 12:
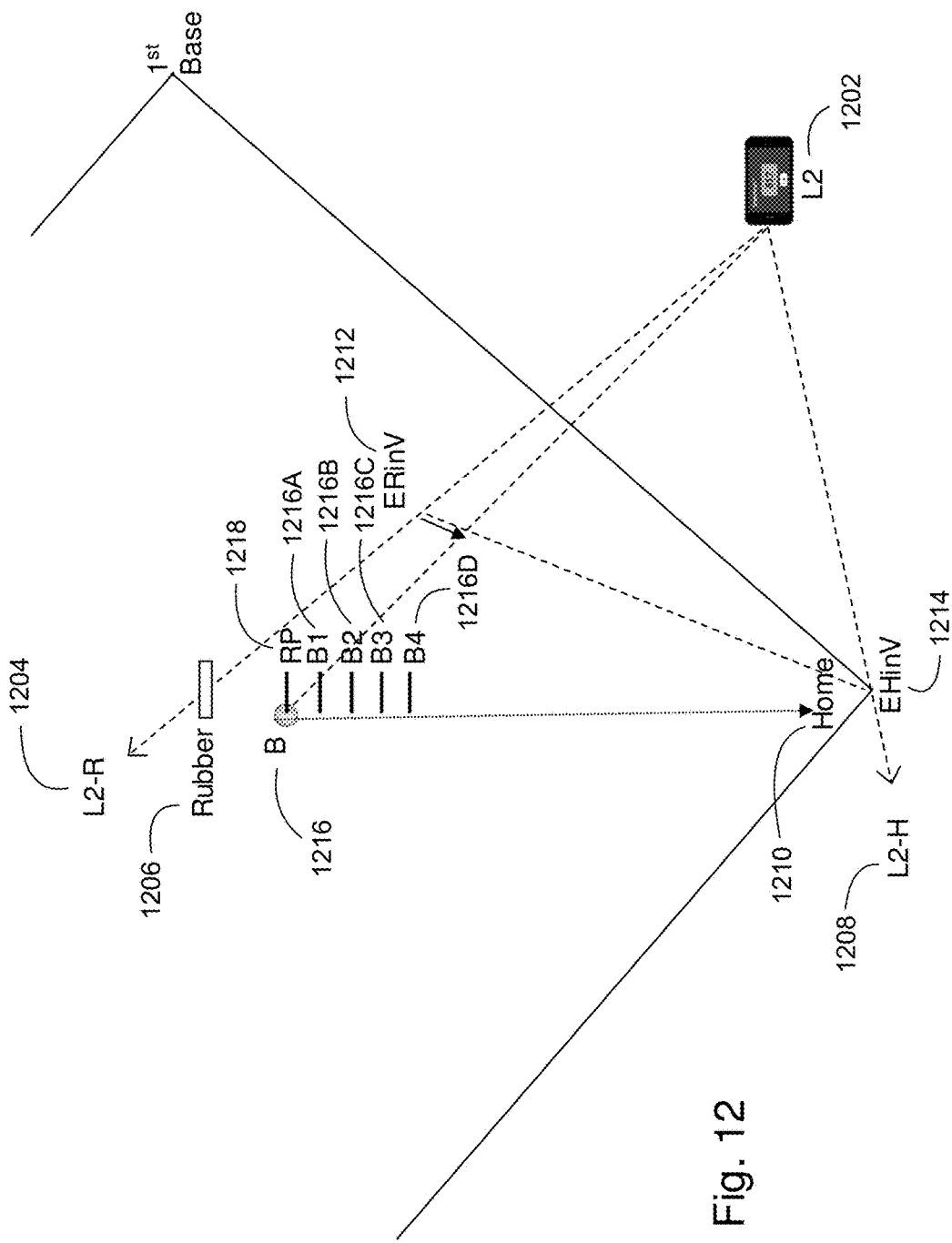

Scaling factors—Mathematical models can be used by the computing device to convert known fixed distances visible in the camera view to actual feet, correcting for angle of view distortions introduced by the perspective affecting the image captured by camera. The disclosed system can convert the camera location into scaling factors specific to that location. FIGS. 11 and 12 present exemplary projections for apparently different release point distance when a same ball is seen from different locations.

FIG. 11 presents an example where video image distance is 17% as opposed 10% of apparent rubber to home distance, where B (1102)=ball at release point 1106; L1 (1104)= camera location 1; B1 (1102A), B2 (1102B), B3 (1102C), B4 (1102D)=ball 1102 in four video frames; L1-R (1108)=line from L1 (1104) to rubber 1110 in video; L1-H (1112)=line from L1 (1104) to home (1114) in video; ERinV (1116)= edge of image view to rubber 1110 in video; and EHinV (1118)=edge at image view to home 1114 in video.

FIG. 12 presents an example where video image distance is 10% as opposed to 15% of apparent rubber to home distance, where L2 (1202)=camera location 2; L2-R (1204)= line from L2 (1202) to rubber 1206 in video; L2-H (1208)= line from L2 (1202) to home 1210 in video; ERinV (1212)= edge of image view to rubber 1206 in video; EHinV (1214)= edge at image view to home 1210 in video; B (1216)=ball at release point 1218; and B1 (1216A), B2 (1216B), B3 (1216C), B4 (1216D)=ball 1216 in four video frames.

Figure 13:
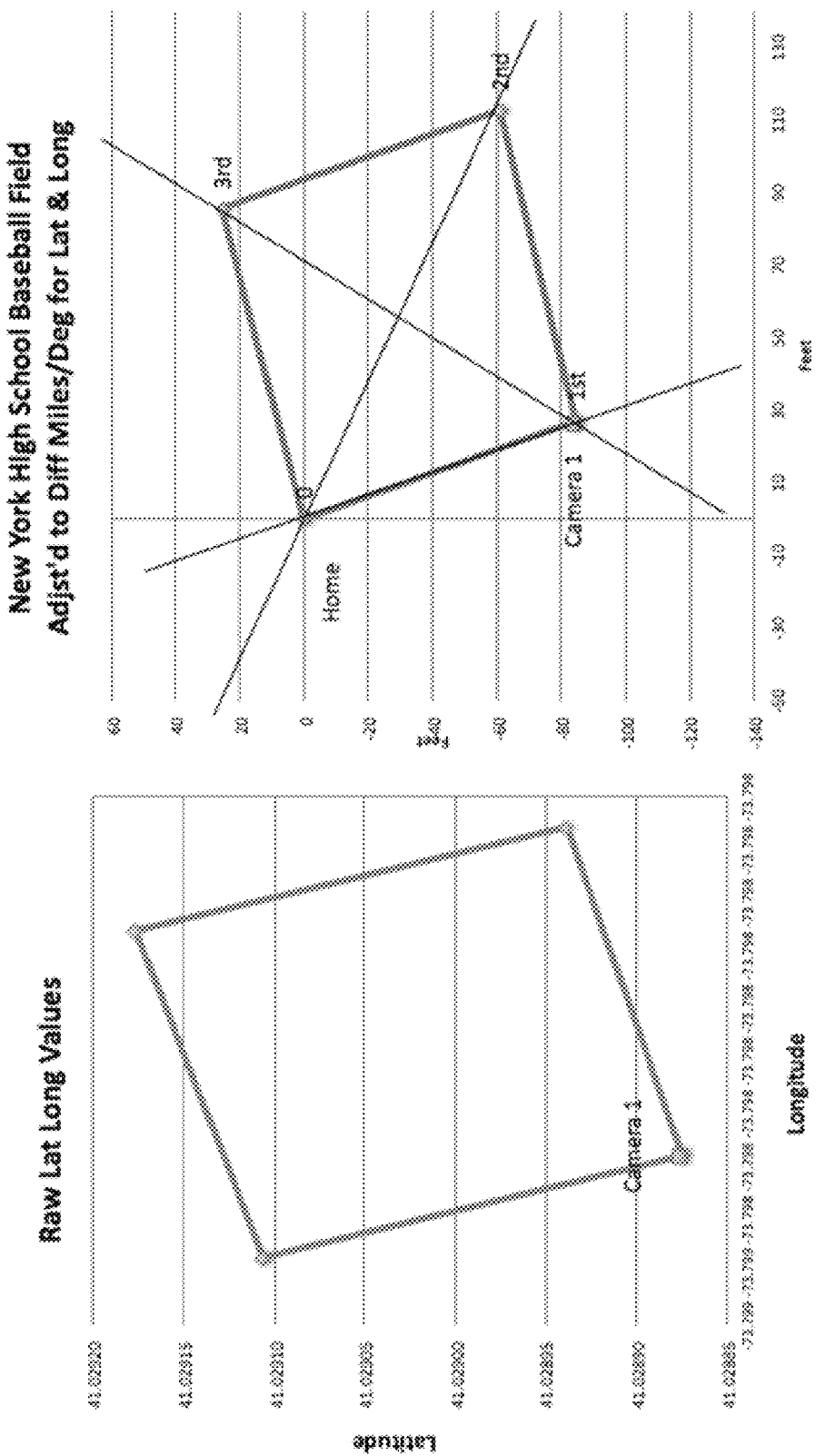
FIG. 13 presents exemplary calculations for adjusting a baseball field for differences in miles per degree of longitude as a function of latitude.

Precision camera location on sports field from latitude and longitude-Latitude and longitude from a map provider such as Google Maps may be converted into sports field coordinates in units of length. FIG. 13 presents exemplary calculations for adjusting a baseball field for differences in miles per degree of longitude as a function of latitude. Variable miles per degree of longitude may be determined as a quadratic function of latitude.

Figure 14:
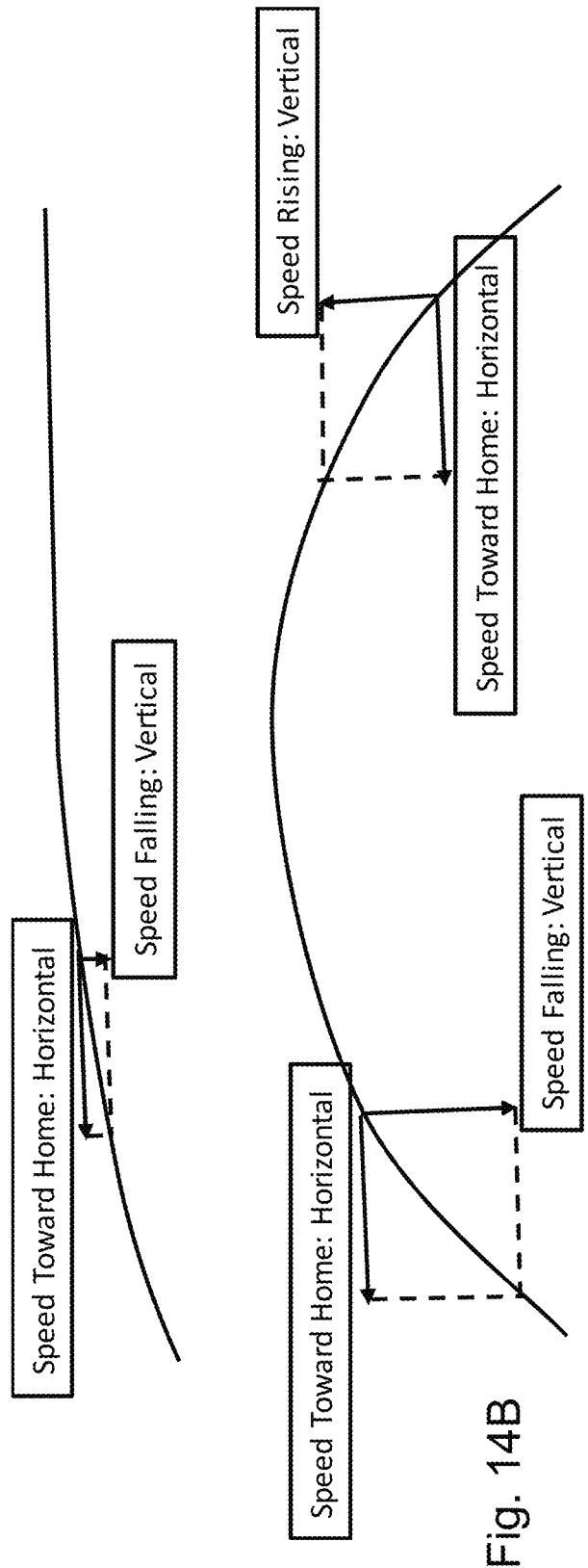
FIGS. 14A and 14B presents exemplary analysis and calculations to adjust for gravity effect which reduces horizontal speed.

Curvature of ball flight from gravity—An adjustment may be made to account for the effect of gravity on the speed of a ball. FIGS. 14A and 14B presents exemplary analysis of ball trajectory or movement to calculate adjustments for gravity effect which reduces horizontal speed (e.g., towards home plate). The processor may also identify pitch height at home plate and create flight path analysis of the ball for different types of pitches or ball movement, such as fastball, curveball, topspin, or in cricket, dead, dusty and green top, for example.

Figure 15:
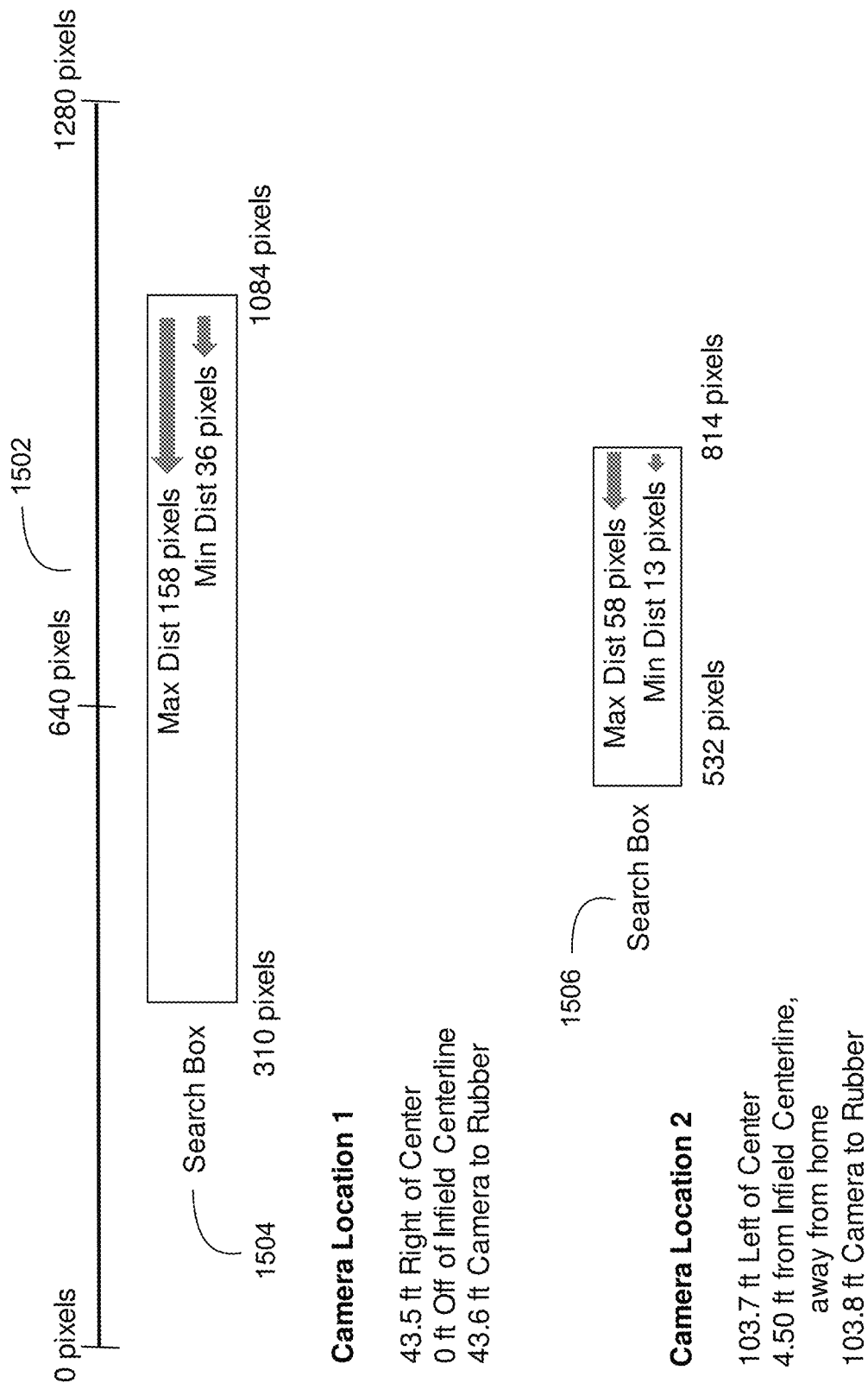
FIG. 15 presents exemplary adjustments to the search box for variable user-chosen camera locations.

Video frame search box and minimum and maximum ball travel—A search box may be used to define a predetermined area to search for a ball within a video frame. FIG. 15 presents exemplary adjustments that can be made by the computing device without the need for user input to the search box for variable user-chosen camera locations. Minimum and maximum ball travel distances may be defined given certain search box sizes (in pixels). Pixel range 1502 is representative of x-coordinates of a camera view from 0 pixels to 1280 pixels. Search box 1504 may be selected based on a "Camera Location 1." The search box 1504 may comprise a window between 310 pixels and 1084 pixels where maximum ball travel distance within the window may be 158 pixels and minimum ball travel distance may be 36 pixels. For "Camera Location 2," search box 1506 may comprise a window between 532 pixels and 814 pixels. The maximum ball travel distance within the window of search box 1506 may be 58 pixels and minimum ball travel distance may be 13 pixels.

FIGS. 1 through 15 are conceptual illustrations allowing for an explanation of the present invention. Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps). In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer readable medium," "computer program medium," and "computer usable medium" are used to generally refer to media such as a random access memory (RAM); a read only memory (ROM); a removable storage unit (e.g., a magnetic or optical disc, flash memory device, or the like); a hard disk; or the like. The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

What is claimed is:

1. A system for measuring speed of a ball or projectile thrown or otherwise projected, the system comprising:
    a camera configured to capture a live video stream including a plurality of frames captured by the camera when positioned at a position in or near an environmental layout in which the ball or projectile will be thrown or projected, the position not necessarily being perpendicular or substantially perpendicular to a direction in which the ball or projectile is to be thrown or projected within the environmental layout;
    a processor;
    a memory having executable instructions stored thereon that when executed by the processor cause the processor to:
        load configuration information for initializing settings for the processor and the camera;
        receive data representative of the environment layout and the position of the camera within the environment layout, the environment layout data including coordinates of at least two points along a path of the ball or projectile for which the distance between the two points is known or calculated;
        using at least one of the frames, determine perspective and angle of planes factor according to the position of the camera by dividing pixels in the at least one frame by the distance between the at least two points to establish one or more pixel-to-distance scales and determining angles and distances relative to the at least two points in the environment layout associated with a camera view plane and a ball or projectile flight plane;
        analyze the plurality of frames to identify a ball or projectile;
        scale a distance traveled by the ball or projectile in each of the plurality of frames on a camera plane of view to an actual travel distance and correcting for angle of view distortions based on the perspective and angle of planes factor;
        determine a trajectory of the ball or projectile;
        calculate a speed of the ball or projectile at or near a release point at which the ball or projectile is thrown or otherwise projected based on the analysis of the frames, the scale, and the trajectory of the ball or projectile;
        generate data representative of the calculated speed; and
    a display operative to display the data representative of the calculated speed.

2. The system of claim 1 wherein the configuration information includes settings for ambient temperature, light sensitivity, field size, field layout, and a pitcher's height.

3. The system of claim 1 wherein the configuration information includes settings for a variety of sports or balls.

4. The system of claim 1 wherein the processor further generates an indication to arrange reference lines within a camera view to align with references of interest.

5. The system of claim 1 wherein the processor analyzes the plurality of frames to identify an initial portion of flight of the ball or projectile from a release object and motion associated with the release object to determine the release point.

6. The system of claim 1 wherein the processor calculates the speed of the ball or projectile according to one or more of the following factors: air drag factor, off-center distortion, vertical distortion, release point adjustment factor, scaling factors, and curvature of ball or projectile flight from gravity.

7. The system of claim 1 wherein the processor further transmits the data representative of the calculated speed to a server.

8. The system of claim 7 wherein the server is operable to connect and communicate with a social network service and to transmit the data representative of the calculated speed to the social network service or in an email message.

9. The system of claim 1 wherein the processor further transmits the data representative of the calculated speed to a peer computing device.

10. The system of claim 1 wherein the processor further transmits the data representative of the calculated speed to a peripheral device.

11. The system of claim 1 wherein the processor further stores the data representative of the calculated speed to a pitch speed, batted ball or projectile release speed, trajectory, and distance history for one or more user accounts.

12. The system of claim 11 wherein the processor further generates a graphical data representation based on the pitch speed, batted ball or projectile release speed, trajectory, and distance history.

13. The system of claim 1 wherein the processor is operable to:
analyze the plurality of frames in a plurality of daylight and artificial lighting conditions; and
adjust video contrast and light sensitivity to accommodate the analysis of the plurality of frames in the plurality of daylight and artificial lighting conditions.

14. The system of claim 1 wherein the processor further identifies pitch height at home plate and analyzes a flight path of the ball or projectile for a plurality of types of pitches or ball movements.

15. The system of claim 1 wherein the processor further converts distance in pixels from the given frames into trial speed using regression modeling and iterative matching convergence to match the trial speed to a physics model of ball flight.

16. Non-transitory computer readable media comprising program code that when executed by a programmable processor causes execution of a method for measuring speed of a ball or projectile thrown or otherwise projected, the computer readable media comprising:
computer program code for loading configuration information for initializing settings for a processor and a camera;
computer program code for receiving data representative of an environment layout and a position of the camera within the environment layout, the environment layout data including coordinates of at least two points along a path of the ball or projectile for which the distance between the two points is known or calculated;
computer program code for capturing a live video stream including a plurality of frames captured by the camera when positioned at a position in or near the environmental layout in which the ball or projectile will be thrown or projected, the position not necessarily being perpendicular or substantially perpendicular to a direction in which the ball or projectile is to be thrown or projected within the environmental layout;
computer program code for, using at least one of the frames, determining perspective and angle of planes factor according to the position of the camera by dividing pixels in the at least one frame by the distance between the at least two points to establish a pixel-to-distance scale and determining angles and distances relative to the at least two points in the environment layout associated with a camera view plane and a ball or projectile flight plane;
computer program code for analyzing the plurality of frames to identify a ball or projectile;
computer program code for scaling a distance traveled by the ball or projectile in each of the plurality of frames on a camera plane of view to an actual travel distance and correcting for angle of view distortions based on the perspective and angle of planes factor;
computer program code for determining a trajectory of the ball or projectile;
computer program code for calculating a speed of the ball or projectile at a release point at which the ball or projectile is thrown or otherwise projected based on the analysis of the frames, the scaling, and the trajectory of the ball or projectile;
computer program code for generating data representative of the calculated speed; and
computer program code for displaying the data representative of the calculated speed on a display.

17. The non-transitory computer readable media of claim 16 wherein the configuration information includes settings for ambient temperature, light sensitivity, field size, field layout, and a pitcher's height.

18. The non-transitory computer readable media of claim 16 wherein the configuration includes settings for a variety of sports or balls.

19. The system of claim 1 further comprising the processor to:
retrieve satellite imagery of the environment layout, the satellite imagery including latitude and longitude information;
convert the position of the camera and the elements within the environment layout into x,y coordinates based on the latitude and longitude.

20. The system of claim 1 further comprising the processor to:
locate the ball or projectile by identifying a set of moving pixels from the plurality of frames that match a ball flight model; and
filter ambient movement in the plurality of frames.

* * * * *